United States Patent
Takenobu

(10) Patent No.: US 7,231,568 B2
(45) Date of Patent: Jun. 12, 2007

(54) SYSTEM DEBUGGING DEVICE AND SYSTEM DEBUGGING METHOD

(75) Inventor: Seiji Takenobu, Chiba (JP)

(73) Assignee: Kawasaki Microelectronics, Inc., Chiba (JP)

( * ) Notice: Subject to any disclaimer, the term of this patent is extended or adjusted under 35 U.S.C. 154(b) by 273 days.

(21) Appl. No.: 10/975,397

(22) Filed: Oct. 29, 2004

(65) Prior Publication Data

US 2005/0114742 A1    May 26, 2005

(30) Foreign Application Priority Data

Nov. 7, 2003    (JP) ............................. 2003-377939

(51) Int. Cl.
  *G01R 31/28*    (2006.01)
  *G01F 15/173*    (2006.01)

(52) U.S. Cl. ...................................... 714/726; 709/240
(58) Field of Classification Search .................... None
  See application file for complete search history.

(56) References Cited

U.S. PATENT DOCUMENTS

| | | | | |
|---|---|---|---|---|
| 5,159,263 A | * | 10/1992 | Yaguchi | 324/537 |
| 5,525,971 A | * | 6/1996 | Flynn | 714/724 |
| 5,636,342 A | * | 6/1997 | Jeffries | 714/48 |
| 6,463,488 B1 | * | 10/2002 | San Juan | 710/107 |

* cited by examiner

*Primary Examiner*—Christine T. Tu
(74) *Attorney, Agent, or Firm*—Oliff & Berridge, PLC

(57) ABSTRACT

A system debugging device in which, even if bus ownership is transferred to other bus masters, the operations of the other bus masters can be monitored such that efficient debugging of a system can be achieved is provided. In a system where a plurality of bus masters mounted on an LSI share a bus, the system debugging device includes a recorder for recording a variety of information including master selection information for specifying a bus master to which a right to use the bus is granted and slave selection information for selecting a bus slave specified according to address signals outputted from the bus master; and a reader for reading, via the bus, the variety of information recorded in the recorder.

10 Claims, 6 Drawing Sheets

Slave 4

SYSTEM DEBUGGING DEVICE AND SYSTEM DEBUGGING METHOD

BACKGROUND OF THE INVENTION

1. Field of Invention

The present invention relates to a system debugging device for debugging a system in which a plurality of bus masters mounted on a large-scale integrated circuit (LSI) share an internal bus.

2. Description of Related Art

FIG. 5 is a diagram showing an example of a technique for debugging a system, in which a central processing unit 32 (CPU) is mounted on an LSI 30 (hereinafter referred to as CPU-containing system). The CPU-containing system in FIG. 5 includes bus masters 34, such as a CPU, a direct memory access (DMA) controller 36, and other bus masters; and bus slaves 38, such as an external memory interface (I/F), an internal memory, and other bus slaves. All of the bus masters 34 and bus slaves 38 are mutually connected via an internal bus 33, and this CPU-containing system is connected via the external memory I/F to an external memory 31.

FIG. 6 is a diagram showing an example of the inner structure of the CPU-containing system in FIG. 5. For ease of explanation, the CPU 32 and the DMA controller 36 are shown as bus masters, while Slave 1, Slave 2, and Slave 3 are shown as bus slaves.

Address signals, bus control signals, and data signals outputted from the CPU 32 and the DMA controller 36 are selectively outputted from a multiplexer MUX 1, according to master selection information outputted from a bus arbiter 12 arbitrating bus ownership, and are inputted into Slave 1, Slave 2, and Slave 3, respectively. Address signals outputted from the multiplexer MUX 1 are also inputted into an address decoder 14 selecting bus slaves. Data signals outputted from Slave 1, Slave 2, and Slave 3 are selectively outputted from a multiplexer MUX 2, according to slave selection information outputted from the address decoder 14, and are inputted into the CPU 32 and the DMA controller 36.

In the CPU-containing system shown in FIG. 6, in order for the CPU 32 and the DMA controller 36, which are bus masters, to use the internal bus, the CPU 32 and the DMA controller 36 send bus request signals (not shown) to the bus arbiter 12.

When the bus request signals are received, the bus arbiter 12 selects, according to the priority of bus ownership (that is, a right to use the internal bus) at that time, a bus master having the highest priority among those that have sent bus request signals. Then, the bus arbiter 12 sends grant signals (not shown) to the selected bus master, so as to indicate that the bus ownership is granted. At the same time, the bus arbiter 12 sends master selection information for specifying the selected bus master to the multiplexer MUX 1.

Address signals, bus control signals, and data signals outputted from the bus master that has received the grant signals are then selectively outputted from the multiplexer MUX 1 according to the master selection information outputted from the bus arbiter 12.

The address decoder 14 decodes the address signals outputted from the multiplexer MUX 1 to generate slave selection signals (not shown). The slave selection signals are signals for selecting a bus slave specified by the address signals and are sent to Slave 1, Slave 2, and Slave 3, respectively. At the same time, the address decoder 14 sends slave selection information for specifying the selected bus slave to the multiplexer MUX 2.

Slave 1, Slave 2, and Slave 3 receive the slave selection signals. When one of the slaves is selected, data signals are written into the selected slave according to the address signals and bus control signals (write signals) outputted from the multiplexer MUX 1. Data signals read from the selected slave according to the address signals and bus control signals (read signals) are selectively outputted from the multiplexer MUX 2 according to the slave selection information outputted from the address decoder 14.

Then, data signals outputted from the multiplexer MUX 2 are received by the bus master that received the above-described grant signals.

When the above-described CPU-containing system is compliant with the joint test action group (JTAG) standard, debugging of the system is normally performed, as shown in FIG. 5, by connecting the CPU 32 to an in-circuit emulator (ICE) via a debugging I/F, and further connecting the ICE to a personal computer (PC), thereby monitoring the operation of the CPU 32, while controlling it, using a debugger (software program for debugging) running on the PC.

Normally, information on a stop address, which is called a breakpoint, from the debugger running on the PC is placed in user software to be debugged. When the CPU reaches the address of the breakpoint, the ICE not only stops the operation of the CPU, but also reads, if necessary, the internal states of registers and memories that are connected to an internal register and internal bus of the CPU into the PC. An operator responsible for debugging proceeds with the debugging process based on this information while monitoring the hardware status.

However, in a known debugging process for a system in which a plurality of bus masters including a CPU are mounted on an LSI, a transfer of bus ownership from the CPU to other bus masters causes debugging to stop, because the CPU cannot monitor the operation of other bus masters in this case. Specifically, the CPU cannot obtain any information, for example, as to whether or not the bus ownership is transferred to other bus masters, and if transferred, as to the size and duration of data transfer, from which bus master to which slave.

Conventional techniques related to the present invention are disclosed, for example, in Japanese Unexamined Patent Application Publication No. 63-167940 (Patent Document 1) and Japanese Unexamined Patent Application Publication No. 5-14451 (Patent Document 2).

Patent Document 1 is concerned with a multiprogramming-oriented CPU responsible for processing of an operating system to achieve multiprogramming. Patent Document 1 discloses means for outputting information concerning a multiprogramming system to an external data bus of the CPU, during execution of a system call instruction, and showing to devices outside the CPU that the information has been outputted to the external data bus.

Patent Document 2 is concerned with a line monitoring method for a data communication system that includes a line control unit performing alternate communication with external data communication devices via a transmission line and a human-machine interface unit performing input and output operations for the entire system. Patent Document 2 discloses that, in the line monitoring method, send data and receive data on an output line and an input line, respectively, in the line control unit are collected at an input/output section of the line independently of a data transmission control circuit for online operation. Also, Patent Document 2 teaches that the collected send/receive data is stored in the data communication system, and the stored send/receive data is displayed according to instructions from the human-machine interface unit.

SUMMARY OF THE INVENTION

An exemplary object of the present invention is to solve the above-described problems in the conventional techniques and provide a system debugging device and a system debugging method where, even if bus ownership is transferred from a CPU to other bus masters, the operation of other bus masters can be monitored so as to achieve efficient system debugging.

To achieve the object described above, various exemplary implementations of the present invention provide for a system debugging device for debugging a system in which a plurality of bus masters mounted on an LSI share a bus, the device including first means for recording a variety of information including master selection information for specifying a bus master to which a right to use the bus is granted, and slave selection information for selecting a bus slave specified according to address signals outputted from the bus master; and second means for reading, via the bus, the variety of information recorded in the first means.

Moreover, various exemplary implementations of the present invention provide for a system debugging device for debugging a system in which a plurality of bus masters mounted on an LSI share a bus, the device including first means for recording a variety of information, including master selection information for specifying a bus master to which a right to use the bus is granted and slave selection information for selecting a bus slave specified according to address signals outputted from the bus master; and second means for outputting, via a JTAG-compliant scan chain, the variety of information recorded in the first means.

Preferably, the above-described exemplary system debugging device may further include third means for setting information for specifying start and stop of recording of the variety of information by the first means; and fourth means for controlling, based on the information set in the third means, start and stop of recording of the variety of information by the first means.

According to various exemplary implementations of the system debugging device of the present invention, it can be seen whether or not bus ownership is transferred to bus masters other than the CPU, during program execution, for example, during the period from the initial state to the next breakpoint, or during the period from one breakpoint to the next breakpoint; and which bus master accesses which slave. Moreover, the detailed status of bus occupation in a certain section can be seen by recording information, such as the amount, duration, and style of data transfer, as necessary. Therefore, the exemplary system can keep track of bus priority and the amount of data transfer in each bus master in real time, thereby reliably determining whether or not hardware and software are properly designed.

DETAILED DESCRIPTION OF PREFERRED EMBODIMENTS

A system debugging device of the present invention will now be described in detail based on preferred embodiments shown in the accompanying drawings.

Figure 1:
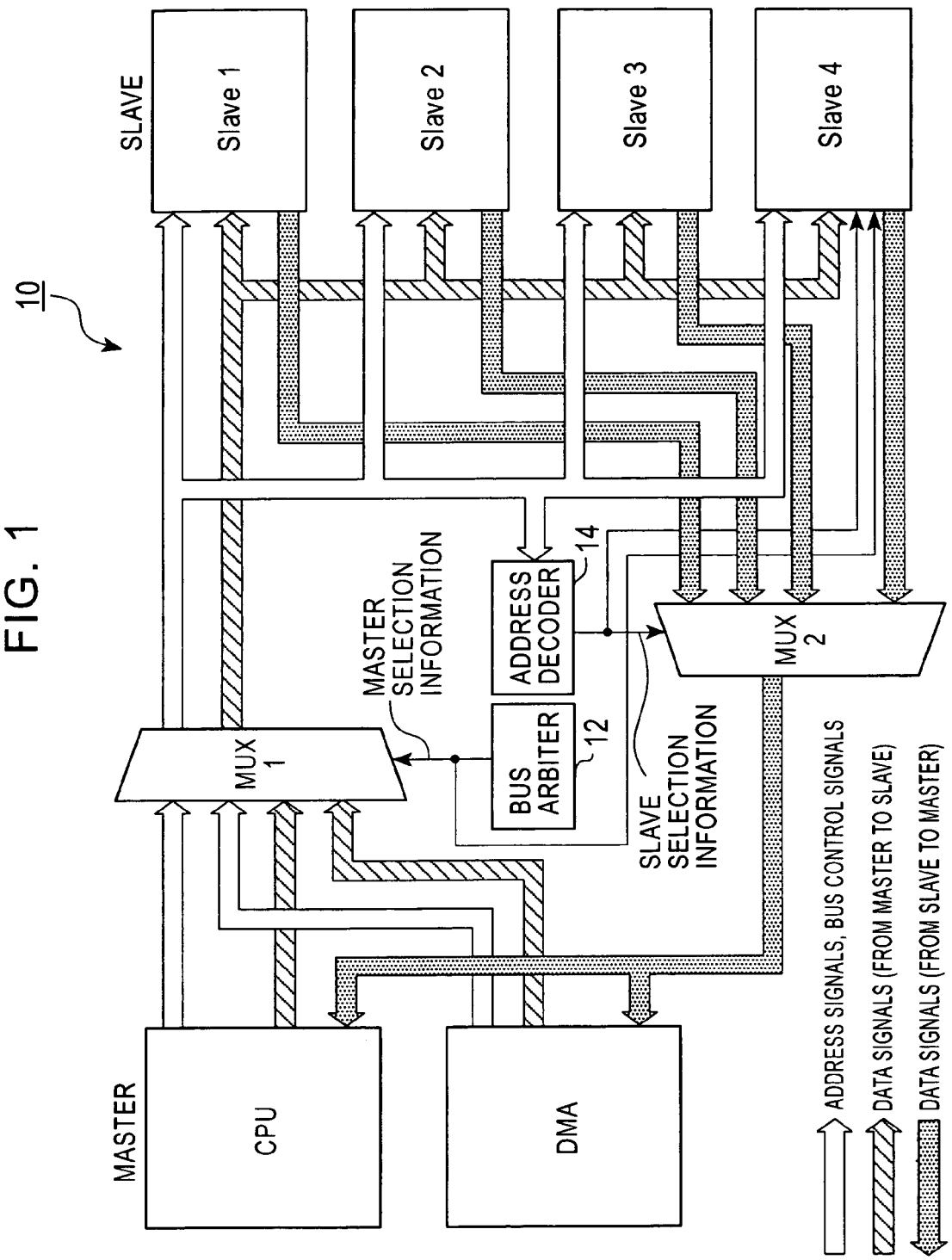
FIG. 1 is a diagram showing an exemplary embodiment of a CPU-containing system to which a system debugging device of the present invention is applied.
Figure 6:
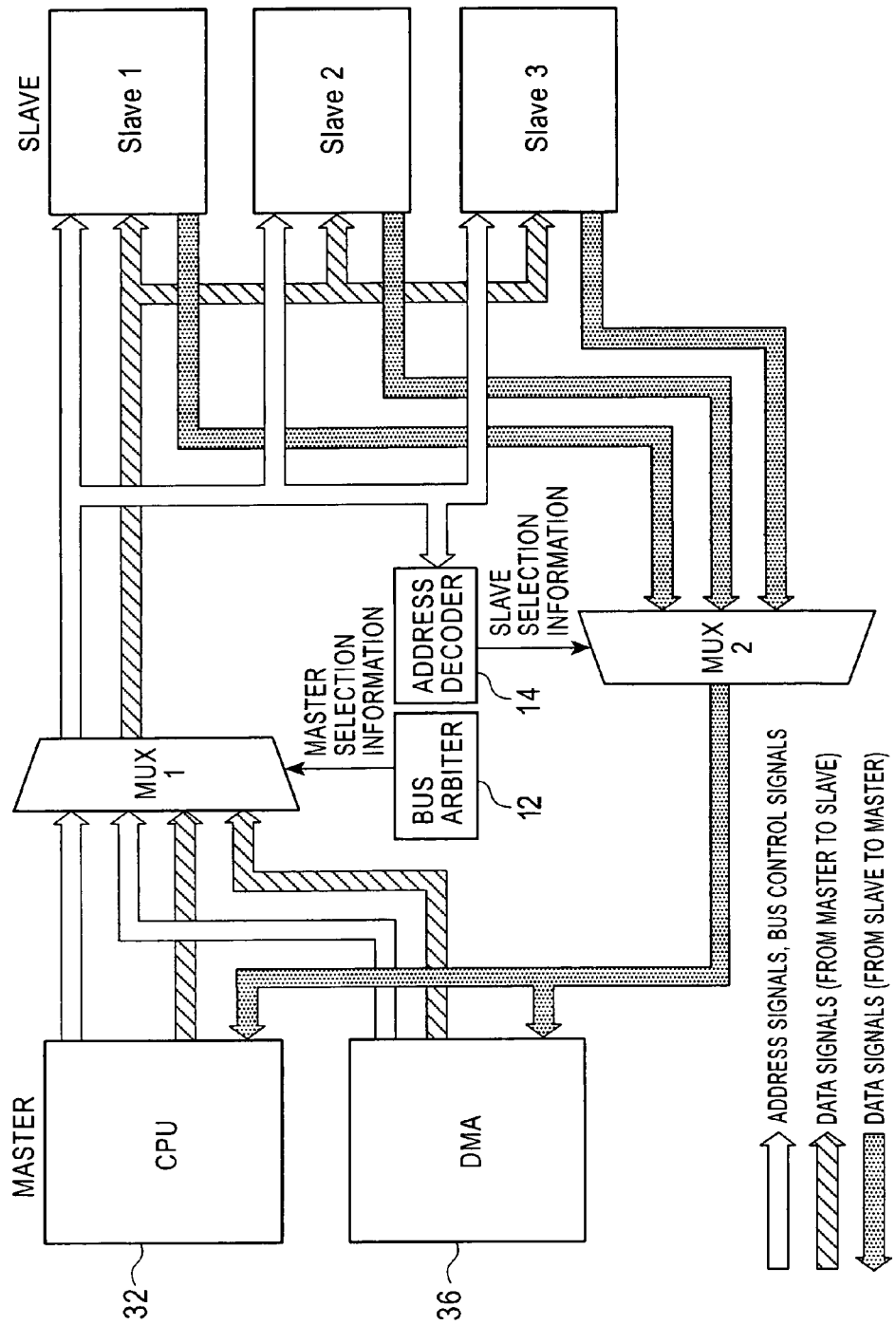
FIG. 6 is a diagram showing an example of the CPU-containing system in FIG. 5.

FIG. 1 is a diagram showing an exemplary embodiment of a CPU-containing system to which a system debugging device of the present invention is applied. According to various exemplary implementations, a CPU-containing system 10 in FIG. 1 is formed by applying the present invention to the CPU-containing system shown in FIG. 6 and is further provided with a bus slave, Slave 4, that is the system debugging device of the present embodiment.

According to various exemplary implementations, Slave 4 is accessible by bus masters, similarly to Slave 1, Slave 2, and Slave 3. Address signals, bus control signals, and data signals that are outputted from a multiplexer MUX 1 are inputted into Slave 4. Moreover, according to various exemplary implementations, master selection information outputted from a bus arbiter 12 and slave selection information outputted from an address decoder 14 are also inputted into Slave 4. Data signals outputted from Slave 4 are inputted into a multiplexer MUX 2.

Figure 2:
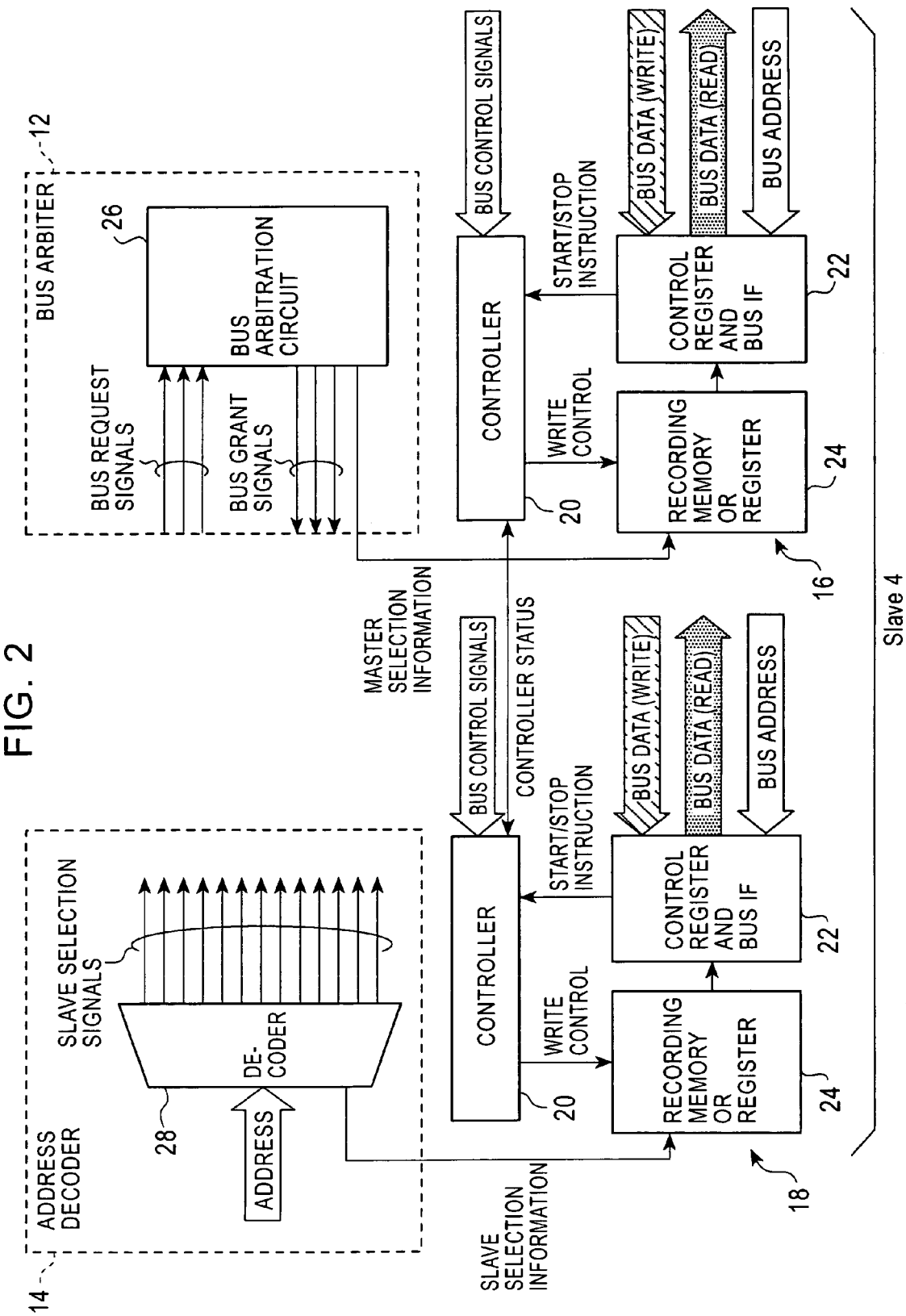
FIG. 2 is a diagram showing a first exemplary embodiment of the system debugging device in FIG. 1.

FIG. 2 is a diagram showing a first exemplary embodiment of the system debugging device in FIG. 1, and shows the inner structure of Slave 4 in FIG. 1. According to various exemplary implementations, Slave 4 includes a first circuit 16 for storing the master selection information outputted from the bus arbiter 12, and a second circuit 18 for storing the slave selection information outputted from the address decoder 14.

According to various exemplary implementations, the first circuit 16 includes a controller 20, a control register and bus I/F 22, and a recording memory or register 24.

According to various exemplary implementations, bus control signals are inputted into the controller 20. A bus address and bus data (write) are inputted into the control register and bus I/F 22, which outputs bus data (read). The bus address, bus data (write), and bus data (read) correspond respectively to the address signals and data signals that are outputted from the multiplexer MUX 1 shown in FIG. 1, and the data signals outputted from Slave 4 shown in FIG. 1.

According to various exemplary implementations, the control register and bus I/F 22 outputs start and stop instructions, which are inputted into the controller 20. The controller 20 outputs write control signals, which are inputted into the recording memory or register 24. Master selection information outputted from a bus arbitration circuit 26 of the bus arbiter 12 is inputted into the recording memory or register 24. According to various exemplary implementations, the master selection information recorded is outputted from the recording memory or register 24 and inputted into the control register and bus I/F 22.

According to various exemplary implementations, the structure of the second circuit 18 is identical to that of the first circuit 16, except that signals inputted into the recording memory or register 24 are not master selection information, but slave selection information outputted from a decoder 28 of the address decoder 14. Therefore, the same components are indicated by the same reference numerals and the detailed description of the second circuit 18 will be omitted. The controllers 20 in the respective first circuit 16 and second circuit 18 are connected, and send and receive the controller statuses to and from each other.

According to various exemplary implementations, the CPU directly sets start and stop instructions, which indicate when to start and stop recording of master selection information and slave selection information, in the control register and bus I/F 22 in each of the first circuit 16 and the second circuit 18.

Alternatively, the CPU may set control information in the control register and bus I/F 22 in each of the first circuit 16 and the second circuit 18 so as to provide circuits for generating start and stop instructions based on the control information. According to various exemplary implementations, the control information includes conditions as triggers for starting, such as when an address reaches a certain value, when a certain bus master is selected, when certain data appears on a bus, and after N data items are sent immediately after the completion of a certain cycle. Triggers for stopping are similar to those for starting.

Start and stop conditions may be determined, for example, by monitoring the states of the bus arbiter 12 and the address decoder 14. Therefore, the master selection information and the slave selection information can be recorded independently, or can be recorded in conjunction with each other. Moreover, the controllers 20 of the respective first circuit 16 and second circuit 18 can perform recording by monitoring each other's states (controller states), for example, in a synchronous or asynchronous manner.

According to various exemplary implementations, when one of the controllers 20 receives start and stop instructions from the corresponding control register and bus I/F 22 to start recording, the controller 20 generates write control signals with reference to bus control signals. The bus control signals include clock signals and information, such as the output timing of valid master selection information or slave selection information. The controller 20 refers to the bus control signals to obtain the timing of recording the master selection information or the slave selection information so as to generate write control signals, such as address signals and write signals.

According to various exemplary implementations, the write control signals from the controller 20 allow the master selection information or the slave selection information to be recorded in the recording memory or register 24 in the first circuit 16 or the second circuit 18.

Then, when start and stop instructions from the control register and bus I/F 22 to stop recording are received, the controller 20 terminates the generation of write control signals, thereby completing the recording of information.

According to various exemplary implementations, after the completion of information recording, the CPU reads, via the control register and bus I/F 22, the information recorded in the recording memory or register 24 and sends the information, via the ICE, to the debugger on the PC. Thus, with reference to the master selection information and the slave selection information, an operator responsible for debugging can keep track of the situation, for example, whether or not the bus ownership is transferred from the CPU to other bus masters, which bus master obtains the bus ownership, and which slave is selected by the bus master.

Although the system debugging device of the present invention, in the embodiment shown in FIG. 1, is installed in the form of Slave 4 on an LSI, the system debugging device of the present invention is not limited to this and may take other forms that can read information stored in the recording memory or register 24. For example, the system debugging device of the present invention may be incorporated in the bus arbiter 12, the address decoder 14, or other bus slaves. Moreover, the system debugging device of the present invention is also applicable to a system in which the functions of the bus arbiter 12 are installed in the CPU.

According to various exemplary implementations, information may be recorded consistently up to a predetermined amount or for a predetermined period of time, instead of using start and stop instructions.

According to various exemplary implementations, a controller 20 may be provided, for example, with a unit for counting the number of clock signals included in bus control signals, and a unit for counting the amount of data transfer, thereby generating and recording information, such as the time required for data transfer and the amount of data transfer. Furthermore, a variety of information including the style of data transfer (such as burst type and data type) can be recorded. The performance of debugging can be improved by recording and referring to such a variety of information.

Figure 3:
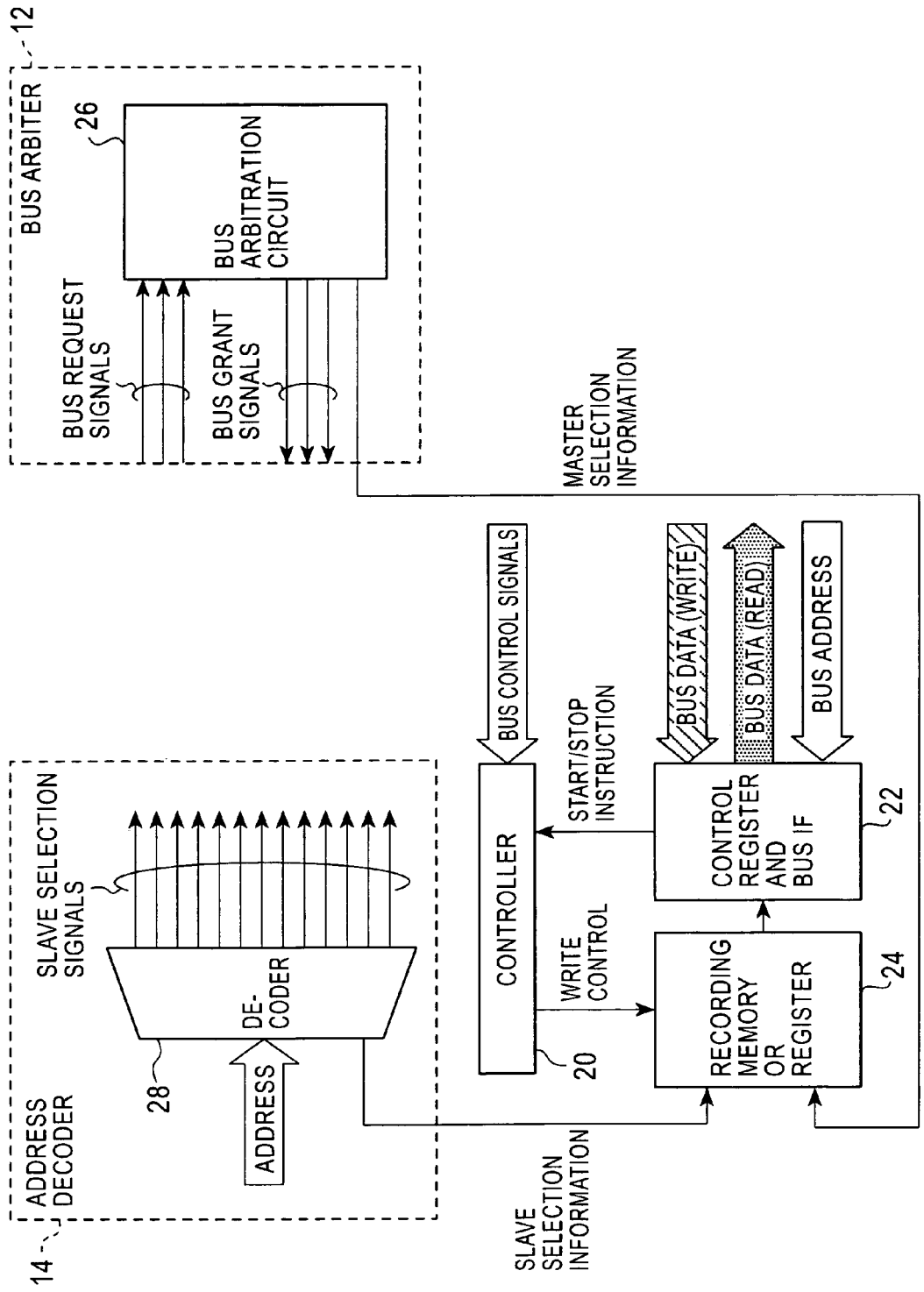
FIG. 3 is a diagram showing a second exemplary embodiment of the system debugging device in FIG. 1.

As shown in FIG. 3, the controller 20, the control register and bus I/F 22, and the recording memory or register 24 in each of the first circuit 16 and the second circuit 18, which are shown in FIG. 2, may be integrated and shared. In this case, master selection information, slave selection information, and the above-described variety of information, when needed, are recorded in the recording memory or register 24. A reduction in circuit size can thus be achieved in the system debugging device shown in FIG. 3.

Figure 4:
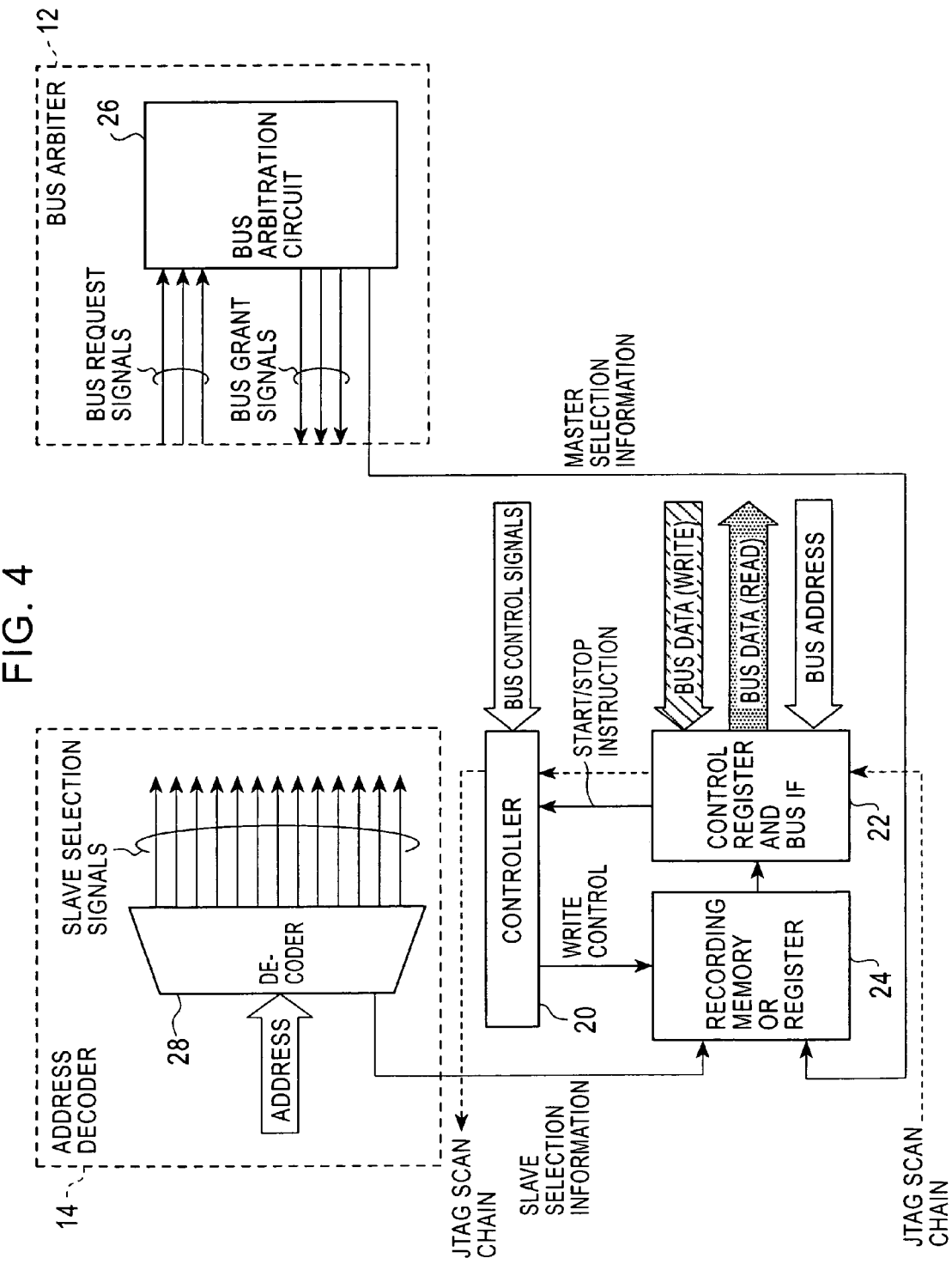
FIG. 4 is a diagram showing a third exemplary embodiment of the system debugging device in FIG. 1.
Figure 5:
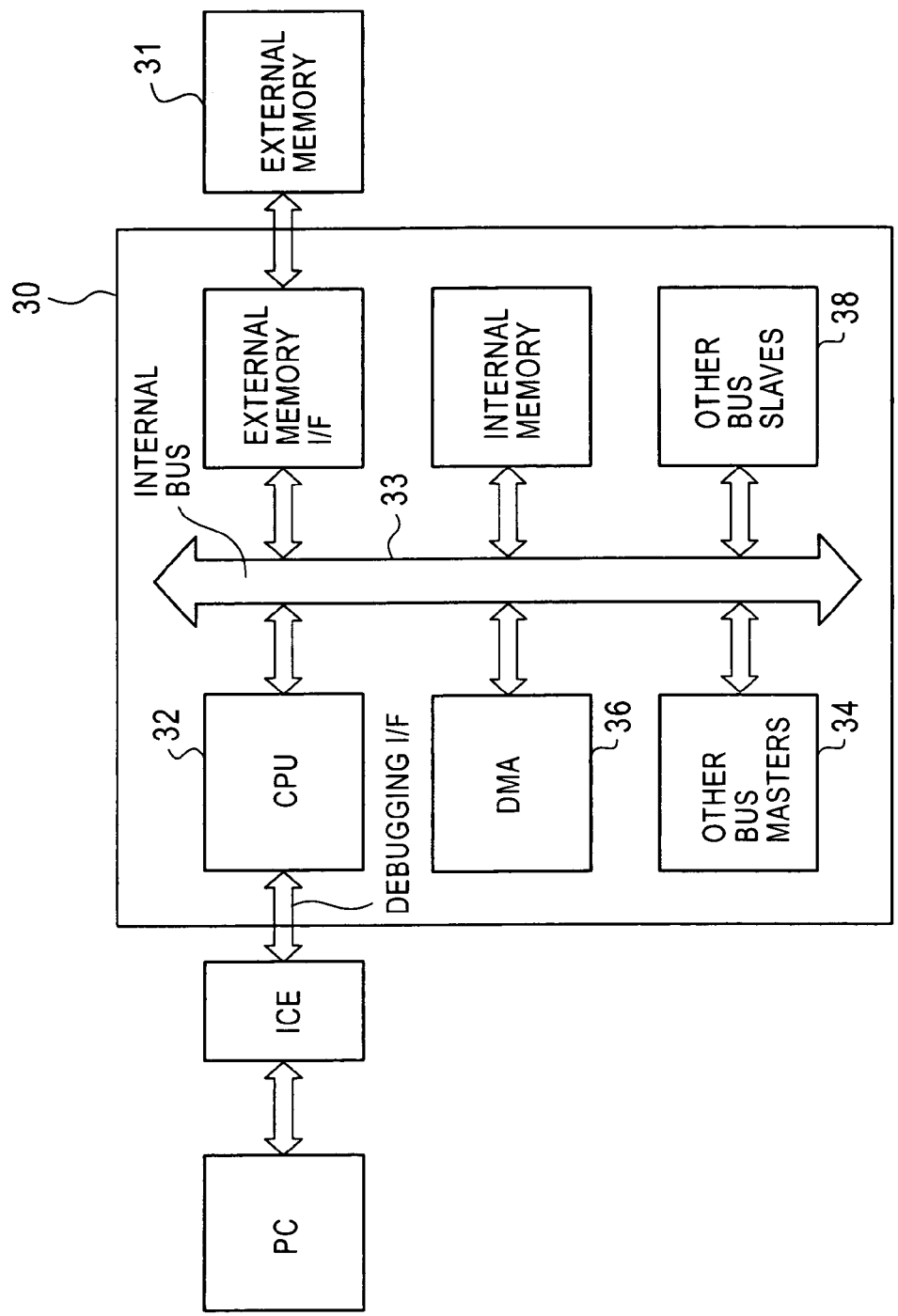
FIG. 5 is a diagram showing an example of a conventional technique for debugging a CPU-containing system.

When the CPU-containing system or the CPU is JTAG compliant, the JTAG standard is also applicable to the system debugging device, as indicated by the dotted lines in FIG. 4. In this case, JTAG scan chains that operate under the same protocol as that of the CPU-containing system or the CPU are provided such that setting of control information, reading of recorded information, start and stop control, and the like can be performed without the CPU accessing the system debugging device via the internal bus.

The above description has been given based on the exemplary system in which a CPU is installed. Debugging can also be efficiently performed through the use of means for reading a variety of stored information to the outside of the chip or by a bus master having this means.

Although the system debugging device of the present invention has been described in detail, the present invention is not limited to the above-described embodiments, but various improvements and changes may be made without departing from the purpose of the present invention.

What is claimed is:

1. A system debugging device for debugging a system in which a plurality of bus masters mounted on an LSI share a bus, the device comprising:
   a recorder that records a variety of information including master selection information for specifying a bus master to which a right to use the bus is granted and slave selection information for selecting a bus slave specified according to address signals outputted from the bus master; and
   an at least one reader that reads, via the bus, the variety of information recorded in the recorder from the specified bus master or the specified bus slave, the at least one reader outputting information based on the variety of information that allows a user to debug the system.

2. The system debugging device according to claim 1, further comprising:
a setting device that sets information for specifying start and stop of recording of the variety of information by the recorder; and
a controller that controls, based on the information set in the setting device, start and stop of recording of the variety of information by the recorder.

3. The system debugging device according to claim 2, further comprising a generator that generates, based on the specified information, instructions to start and stop recording.

4. The system debugging device according to claim 1, wherein the variety of information includes the amount, duration, and style of data transfer.

5. A system debugging device for debugging a system in which a plurality of bus masters mounted on an LSI share a bus, the device comprising:
a recorder that records a variety of information including master selection information for specifying a bus master to which a right to use the bus is granted and slave selection information for selecting a bus slave specified according to address signals outputted from the bus master; and
an at least one output device that outputs, via a JTAG-compliant scan chain, the variety of information recorded in the recorder from the specified bus master or the specified bus slave, the at least one output device outputting information based on the variety of information that allows a user to debug the system.

6. The system debugging device according to claim 5, further comprising:
a setting device that sets information for specifying start and stop of recording of the variety of information by the recorder; and
a controller that controls, based on the information set in the setting device, start and stop of recording of the variety of information by the recorder.

7. The system debugging device according to claim 6, further comprising a generator that generates, based on the specified information, instructions to start and stop recording.

8. The system debugging device according to claim 5, wherein the variety of information includes the amount, duration, and style of data transfer.

9. A system debugging device for debugging a system in which a plurality of bus masters mounted on an LSI share a bus, the device comprising:
a recording memory for recording, according to write control signals, a variety of information including master selection information for specifying a bus master to which a right to use the bus is granted and slave selection information for selecting a bus slave specified according to address signals outputted from the bus master;
a control register for setting start and stop instructions indicating start and stop of recording;
an at least one reader outputting information based on the variety of information that allows a user to debug the system; and
a controller for generating the write control signals according to the start and stop instructions; wherein
transfer of the right to use the bus is ascertained by reading the variety of information recorded.

10. A system debugging method for debugging a system in which a plurality of bus masters share a bus, the method comprising the steps of:
recording a variety of information including master selection information for specifying a bus master to which a right to use the bus is granted and slave selection information for selecting a bus slave specified according to address signals outputted from the bus master;
reading, via the bus, the variety of information recorded from the specified bus master or the specified bus slave; and
outputting information based on the variety of information that allows a user to debug the system.

* * * * *